Aug. 13, 1935.　　　　J. W. GALLO　　　　2,011,402
VELOCIPEDE
Filed Feb. 20, 1934
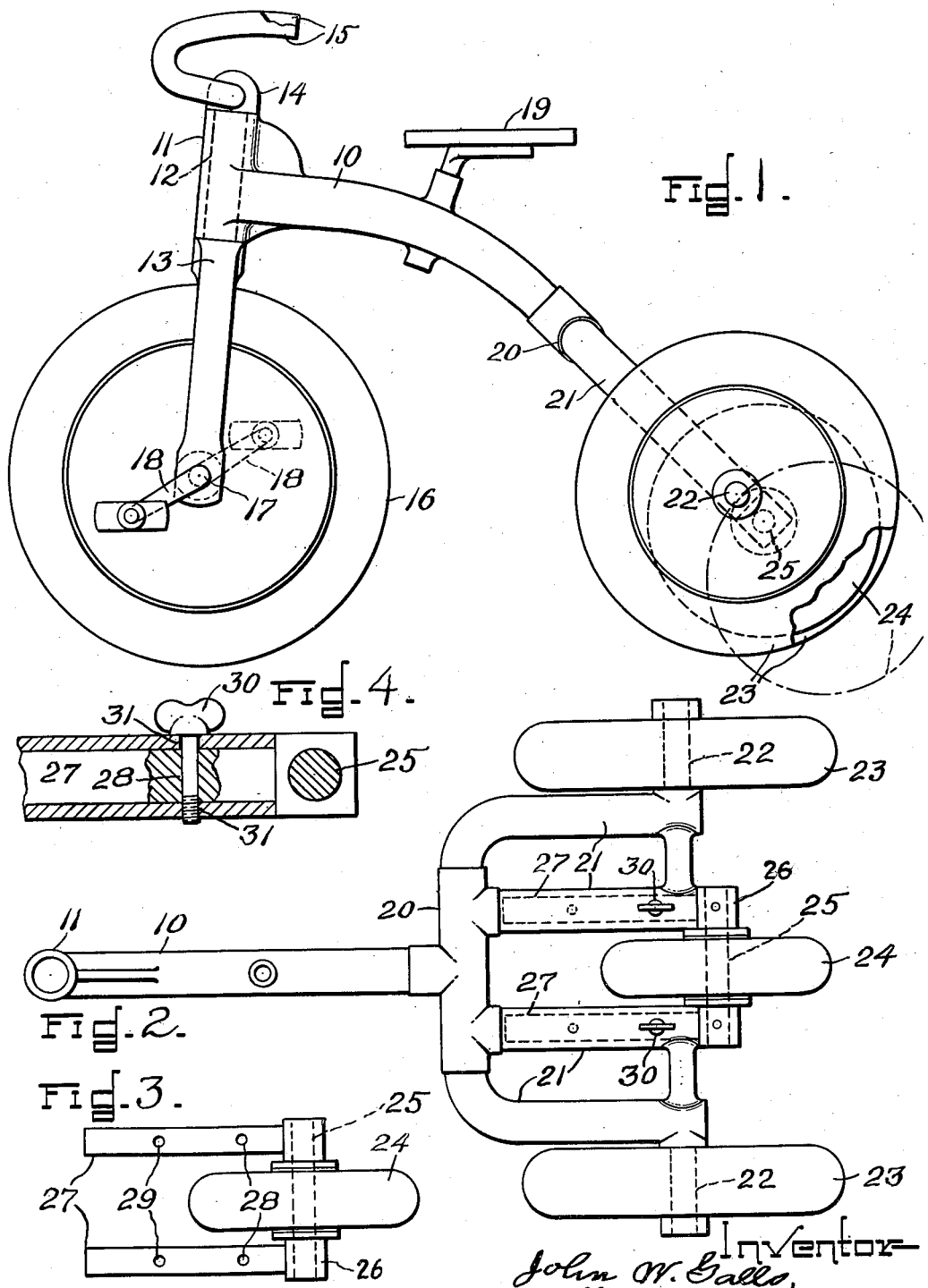
Inventor
John W. Gallo
By Arthur T. Kendall
atty.

Patented Aug. 13, 1935

2,011,402

UNITED STATES PATENT OFFICE 2,011,402

VELOCIPEDE

John W. Gallo, Revere, Mass.

Application February 20, 1934, Serial No. 712,232

3 Claims. (Cl. 208—113)

My invention relates to velocipedes and it has for its object to provide a convertible velocipede which can be used either as a bicycle or a tricycle.

To these ends my invention consists of a velocipede having three rear wheels arranged transversely side by side connected with the frame of the machine so that the two outside wheels can be used to the exclusion of the intermediate wheel, or the intermediate wheel may be used to the exclusion of the two outside wheels, so that it can be readily converted from a bicycle into a tricycle and vice versa.

Other features of my invention are hereinafter pointed out.

In the accompanying drawing:—

Figure 1 is a side elevation of a velocipede constructed in accordance with my invention.

Figure 2 is a top plan view of the frame and the three rear wheels.

Figure 3 is a detail of the intermediate wheel and its yoke hereinafter described.

Figure 4 is a detail hereinafter described.

The embodiment of my invention herein illustrated comprises a main frame 10 whose forward end is constructed with a socket 11 within which is rotatably mounted a shank 12 of a front fork 13. The shank 12 of fork 13 is provided at its upper end with a head 14 equipped with a pair of handle bars 15. A relatively large front wheel 16 has its axle 17 journaled in bearings at the lower ends of the arms of the fork 13. This axle is provided with crank pedals 18, by means of which the user propels the vehicle over the ground.

Intermediate its ends the main frame 10 is provided with a seat 19 for the user.

So far as above described the construction is as usual.

The rear end portion of the main frame 10 is made with a rearwardly extending fork 20 each arm of which is itself forked as at 21.

Each fork 21 includes as an integral part thereof an axle 22 on which is rotatably mounted a rear side wheel 23.

The inner arms of the forks 21 are straight and parallel with respect to each other and with respect to the vertical median plane of the structure. These two inner arms of the forks 21 are spaced apart to provide a space for an intermediate wheel 24 which is disposed midway between the wheels 23 and within said vertical median plane. The intermediate wheel 24 is loosely mounted on a short axle 25 to each end of which is fixed a sleeve or hub 26 constructed with an integral stem 27 which is telescopically and slidably mounted within the straight inner arm of one of the forks 21. Each stem 27 is made with two apertures 28 and 29, while the inner straight arm of each fork 21 is formed with a hole 31 through it near the lower end thereof. The yoke comprising axle 25, sleeves 26 and stems 27 is adjustable relatively to the forks 21 of the frame and toward and from the ground by sliding the stems 27 within the inner straight arms of forks 21. Normally, however, this yoke is locked against movement relatively to frame 10 by means of two screws 30. The inner straight arm of each fork 21 is formed at its top and bottom and near the lower end of said arm, with aligned apertures 31 to receive one of the pins 30 as shown in Figure 4, one of said holes being threaded for engagement with its screw 30.

It will thus be clear that the pins 30 can be utilized to rigidly hold the yoke of the intermediate wheel 24 against movement relatively to frame 10 by inserting said pins within the apertures 31 so that they extend through either the holes 28, or the holes 29, of stems 27.

When the yoke of intermediate wheel 24 occupies its most elevated position the holes 28 of its yoke are in register with the apertures 31 of the forks 21 so that when the pins are within of the forks 21 so that when the pins are within said apertures and holes the yoke of wheel 24 is locked in its elevated position and the vehicle is usable as a tricycle since it will then be supported by the front wheel 16 and the two rear side wheels 23.

When it is desired to use the vehicle as a bicycle the pins 30 are withdrawn and the yoke of the intermediate wheel 24 is pulled downwardly until the holes 29 of stems 27 are in register with the apertures 31 of the yokes 21, whereupon the pins 30 are replaced so as to extend through the apertures 31 and said holes 29. When the intermediate wheel is thus locked in its lowermost position, indicated by dotted lines in Fig. 1, its ground engaging tread portion is below the bottoms of the side wheels 23 and the rear end of the frame 10 is supported entirely by said intermediate wheel while the front end of the frame is supported by the dirigible front wheel 16.

The above described velocipede is of very simple and inexpensive construction and it can, with convenience and dispatch, be converted from a bicycle to a tricycle, or vice versa.

To those familiar with this art it will be clear that the frame 10, particularly the forked rear end portion thereof, excepting the axles 22 and 25, may be made up from lengths of metal tubing brazed or otherwise fastened together.

What I claim is:

1. A vehicle of the character described comprising a frame; a single dirigible front wheel adjustably connected with said frame; three rear wheels disposed side by side, including an intermediate wheel; mechanism connecting said intermediate wheel with said frame so that it can be adjusted independently toward the ground to an extent sufficient to elevate the two side wheels above the ground without adjustment of said side wheels relatively to said frame so as to provide a bicycle and also so that said intermediate wheel can be adjusted away from and out of engagement with the ground thereby to transfer the support of said frame to said side wheels and provide a tricycle.

2. A vehicle of the character described comprising a frame and three rear frame-supporting wheels including two side wheels and an intermediate wheel disposed between said side wheels; a yoke on which said intermediate wheel is journaled, said yoke being slidably connected with said frame so as to be adjusted independently toward and from the ground thereby to transfer the support of said frame from said side wheels to said intermediate wheel without changing the relative positions of said side wheels and frame and vice versa, and means for fixing said yoke at the limit of its movement in either direction relatively to said frame.

3. A vehicle of the character described constructed in accordance with claim 2 wherein said frame is made with a fork at its rear end including two parallel spaced apart tubular arms between which said intermediate wheel is disposed; wherein said yoke includes a transversely disposed axle for said intermediate wheel and a pair of stems connected with the opposite ends of said axle, said stems being telescopically and adjustably fitted within said tubular arms so that said yoke and intermediate wheel are movable toward and from the ground, and means for fastening said stems in position within said tubular arms at the limit of their endwise movement in either direction.

JOHN W. GALLO.